United States Patent

Yates et al.

[11] Patent Number: 5,915,492
[45] Date of Patent: Jun. 29, 1999

[54] SOIL COMPACTOR AND TRACTION CONTROL SYSTEM THEREON

[75] Inventors: Steve K. Yates, Scotland; Edward D. Magalski, York, both of Pa.; Keith Williams, Minnetonka, Minn.

[73] Assignee: Ingersoll-Rand Company, Woodcliff Lake, N.J.

[21] Appl. No.: 09/085,315

[22] Filed: May 26, 1998

Related U.S. Application Data

[63] Continuation of application No. 08/940,727, Sep. 30, 1997, abandoned, which is a continuation of application No. 08/537,181, Sep. 29, 1995, abandoned.

[51] Int. Cl.⁶ .................................................. B60K 28/16
[52] U.S. Cl. ......................... 180/197; 180/20; 180/307; 701/82
[58] Field of Search ............................ 180/197, 20, 305, 180/307, 308; 701/50, 68, 82, 83, 84, 87, 90; 404/122

[56] References Cited

U.S. PATENT DOCUMENTS

| | | | |
|---|---|---|---|
| 4,399,886 | 8/1983 | Pollman | 180/197 |
| 4,402,377 | 9/1983 | Brooks et al. | 180/197 |
| 4,976,331 | 12/1990 | Noerens | 180/197 |
| 5,201,570 | 4/1993 | Heren et al. | 180/197 X |
| 5,564,519 | 10/1996 | Katoh et al. | 180/197 X |

OTHER PUBLICATIONS

Sauer Sundstrand DC2 Microcontroller Brochure, Issued Mar., 1993.

*Primary Examiner*—Kevin Hurley
*Attorney, Agent, or Firm*—Mark A. Ussai

[57] ABSTRACT

An earth compactor is propelled by a hydraulic circuit that includes a first hydraulic motor to drive a drum member and a second hydraulic motor to drive a tractor member mounted on tires, with a traction control system that includes a motor speed sensing device on each hydraulic motor. The speed sensing devices transmit electrical signals to a microcontroller, which compares the speeds and varies the speed of the tires or drum to maintain a preselected ratio between the two, thereby maintaining traction of both members. The compactor includes a ground slope sensing device which generates electrical signals and transmits the signals to the microcontroller such that, whenever the tires become elevated above the drum, the microcontroller lowers the speed of the tires and the drum to prevent tire hop.

4 Claims, 3 Drawing Sheets

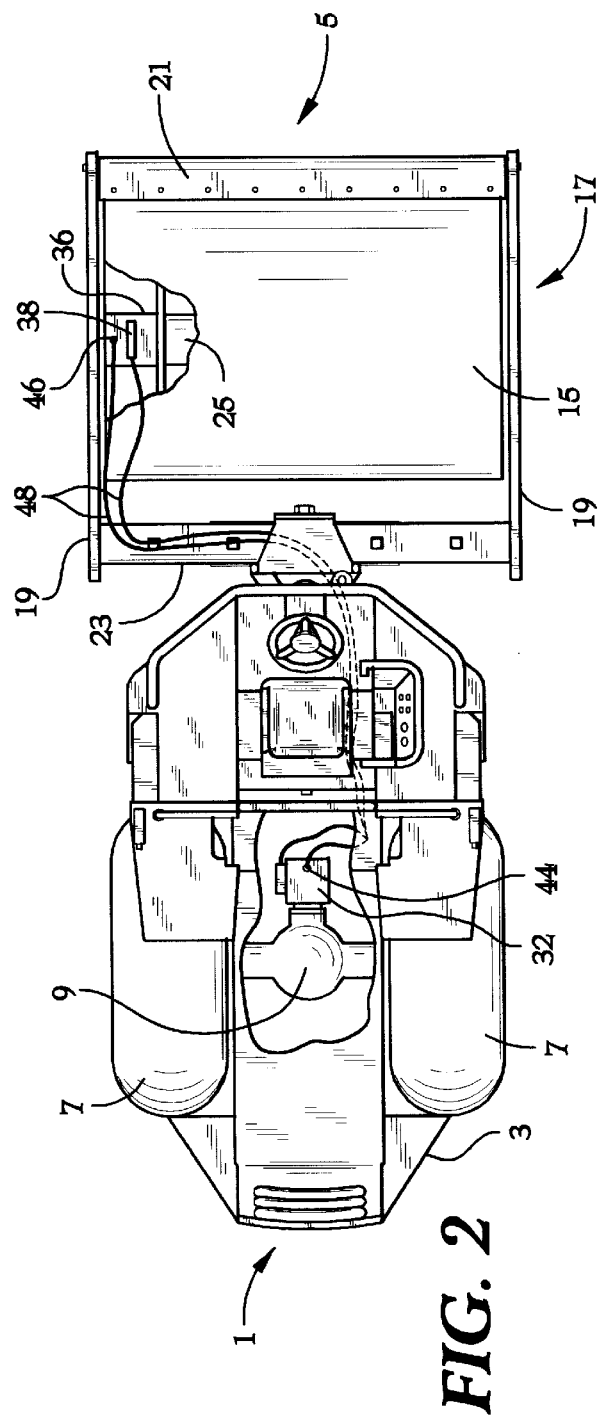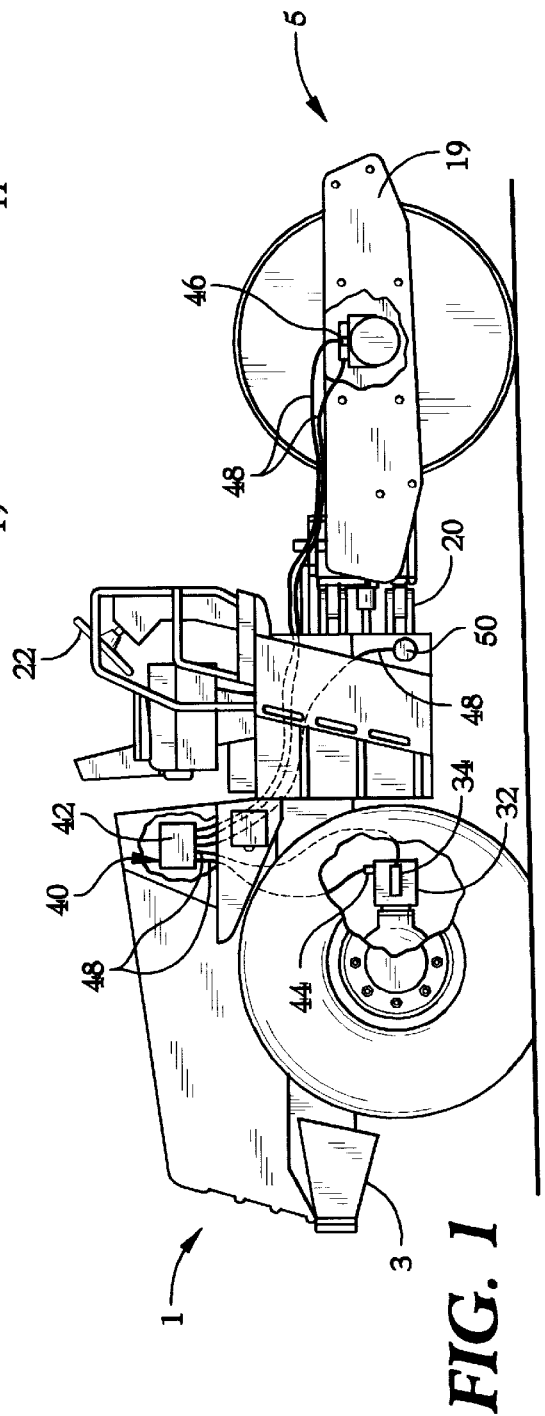

SOIL COMPACTOR AND TRACTION CONTROL SYSTEM THEREON

BACKGROUND OF THE INVENTION

This is a continuation application of Ser. No. 08/940,727, filed Sep. 30, 1997, now abandoned, which is a continuation of application Ser. No. 08/537,181, filed on Sep. 29, 1995, now abandoned.

This invention relates generally to mobile earth compactors, and more particularly to traction control systems in compactors.

Prior art soil compactors have a closed loop, parallel circuit traction system which consists of an axle with tires and in the rear of the unit and a steel drum that drives in the front. The axle is driven by a high speed hydraulic motor fitted into the axle's differential housing. The axle contains a no-spin differential that restricts one tire from spinning out and disabling power to the other; both tires will attempt to drive the compactor. The drum is driven by either a gear box with a high speed low torque hydraulic motor input or a low speed high torque hydraulic motor. In this system, if either the tires or the drum spin because of loss of sufficient friction to the ground the other driving element basically becomes non-driving because all the hydraulic pump flow is directed to the spinning element, taking the path of least resistance. When this happens the hydraulic pressure in the system is also reduced further limiting the machine's capability.

Presently the system used to counter this problem on high grades is a traction valve or hydraulic flow divider/combiner. This component splits the flow from or returning to the hydraulic pump into front and rear flows where each flow is directed to the particular driving element in order to power it, therefore keeping full pump flow from going to a single spinning element. The problem with this type of system is the heat generated in it due to the valving internal in the component as well as the method of control; that being pressure drop in the system loop between the front and rear element circuits. Also some flow divider systems are only engaged when the operator operates a switch, in these cases the wheels or drum have usually displaced some amount of soil which will in turn increase the effective grade the machine is attempting to climb. Therefore this delay in operation versus functional need is also a disadvantage to this system.

The foregoing illustrates limitations known to exist in present compactors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a soil compactor comprising: tractor means for supporting a rear portion of the compactor, the tractor means mounted on a pair of tires rotatably connected to a first transverse axle; drum means for compacting material having a rotatable drum mounted on a second transverse axle parallel to the first axle, the drum means connected to the tractor means; a closed loop, parallel hydraulic circuit means for propelling the compactor, the hydraulic circuit means comprising: first hydraulic motor means for rotating the tires, the first motor means including an electronic torque control means for varying the torque applied by the first motor means; and second hydraulic motor means for rotating the drum, the second motor means including an electronic torque control means for varying the torque applied by the second hydraulic motor means; and traction control means for controlling the hydraulic circuit means to selectively and independently vary the first and second hydraulic motors, whereby the tire rotation speed and the drum rotation speed are controlled to within a predetermined ratio of each other.

The foregoing and other aspects will become apparent from the following detailed description of the invention when considered in conjunction with the accompanying drawing figures.

BRIEF DESCRIPTION OF THE DRAWING FIGURES

FIG. 1 is a schematic elevational side view, partially in cross-section, of a compactor of the invention;

FIG. 2 is a schematic plan view, partially in cross-section, of a compactor of the invention;

DETAILED DESCRIPTION

Figure 3:
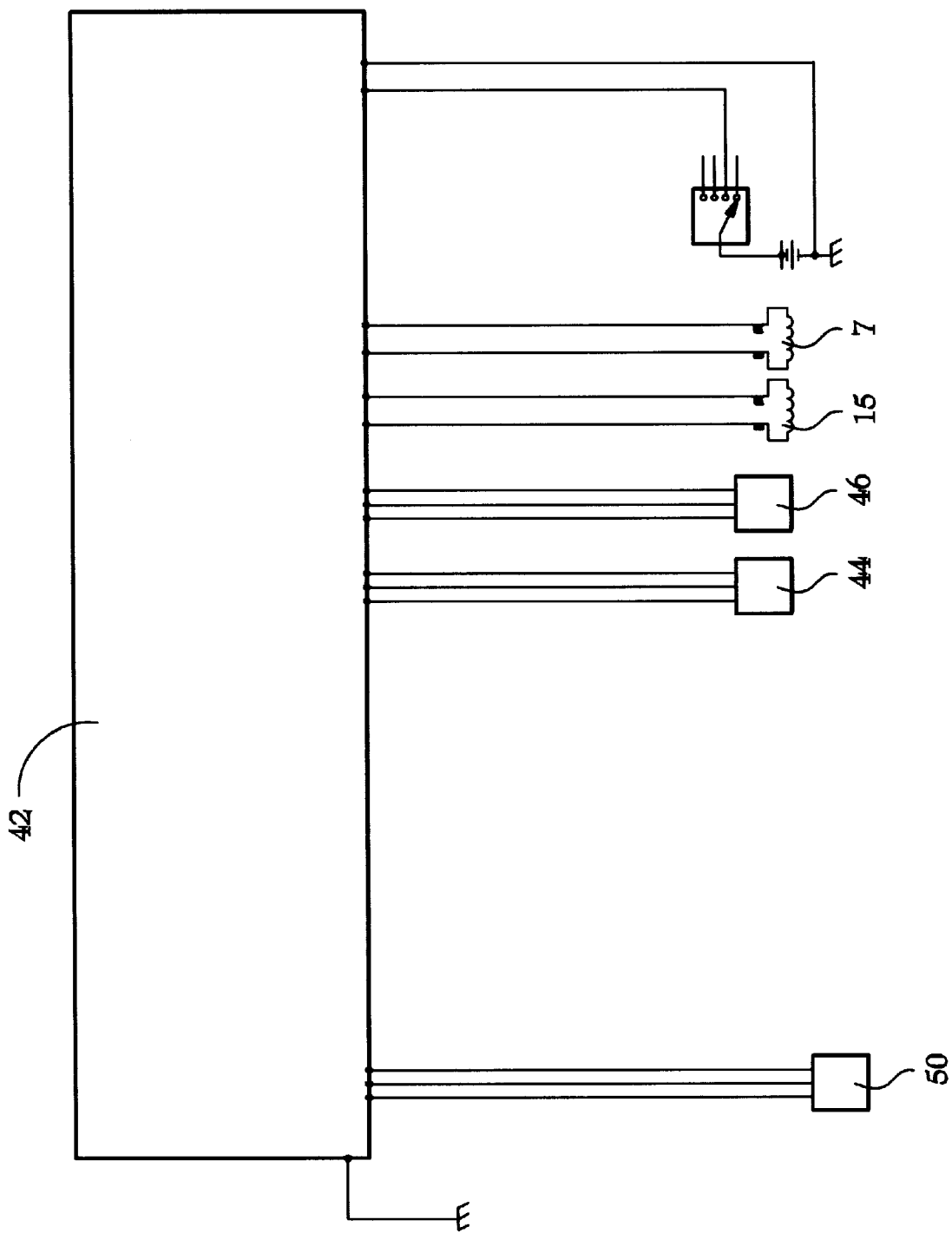
FIG. 3 is a schematic electrical circuit of the invention.

FIGS. 1 and 2 show an earth compactor 1 which can be of the vibratory type or of the non-vibratory type. Compactor 1 includes a rear tractor portion 3 and a front drum portion 5. Rear tractor portion 3 is mounted on a pair of rotatable pneumatic tires 7 that are interconnected to each other by a first transverse axle 9, as is conventional. Drum portion 5 includes a planar, rotatable steel drum 15 for compacting material. Drum 15 is mounted on a drum frame 17 formed by a pair of parallel side frame members 19 connected to a pair of parallel front and rear members 21, 23 respectively. Drum 15 is mounted for rotation on a second transverse axle 25 that is parallel to first axle 9, as is conventional. Drum 17 is connected to tractor portion 3, in this case by a conventional articulated joint 20. Articulated joint 20 is used to steer compactor 1 in response to operator manipulated steering wheel 22, as is well known. Articulated joint 20 is optional, as this invention will work with a compactor in which drum portion 5 and tractor portion 3 are rigidly connected.

Carried on compactor 1 is a closed loop, parallel hydraulic circuit means, described hereinafter, for propelling compactor 1. The hydraulic circuit means includes first hydraulic motor 32 for rotating tires 7. First motor 32 includes a conventional electronic torque control means 34 (FIG. 1) for varying the torque applied by motor 32. Motor 32 can control torque by varying the hydraulic displacement of motor 32 by manipulating a "swash plate" within motor 32. Alternatively, a motor can be used that controls torque by manipulating hydraulic pressure within the motor. Varying the torque applied by motor 32 varies the rotational speed of tires 7, as is well known.

Hydraulic circuit means further includes second hydraulic motor 36 for rotating drum 15. Second motor 36 includes a conventional electronic torque control means 38 for varying the torque applied by motor 36. Motor 36 can control torque by varying the hydraulic displacement of motor 36 by manipulating a "swash plate" within motor 36. Alternatively, a motor can be used that controls torque by manipulating hydraulic pressure within the motor. Varying the torque applied by motor 36 varies the rotational speed of drum 15, as is well known.

The hydraulic circuit means further includes a traction control means 40 (FIG. 1) that controls hydraulic circuit means to selectively and independently vary the speed of motors 32, 36, whereby the tire rotational speed and drum rotational speed are maintained within a predetermined ratio of each other. We prefer a 5 percent slippage rate against the fixed ratio of driving elements. However, this ratio can vary somewhat, depending upon the machine, the type of material being compacted and the specifications of motors 32, 36. Traction control means 40 permits this ratio to be input into a microcontroller 42, described hereinafter, to customize the performance of compactor 1.

Traction control means 40 makes use of a first speed sensing means 44 of motor 32, that is conventionally provided with motor 32. Traction control means 40 also makes use of a second speed sensing means 46 of motor 36, that is conventionally provided with motor 36.

The speed sensing means 44 of motor 32 senses the rotational speed of motor 32 and generates a first electrical signal proportional thereto. The speed sensing means 46 of motor 36 senses the rotational speed of motor 36 and generates a second electrical signal proportional thereto.

Figure 4:
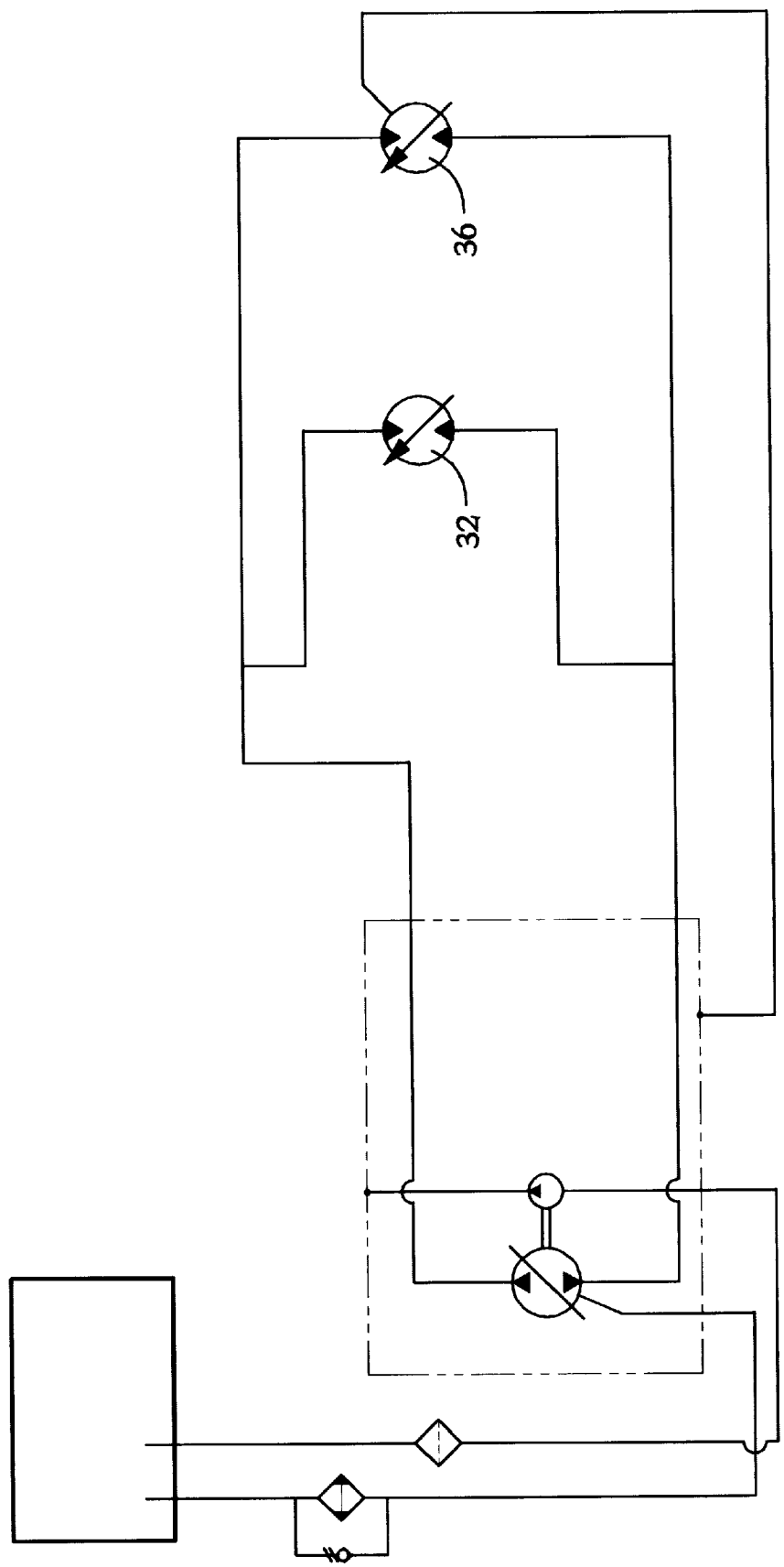
FIG. 4 is a schematic hydraulic circuit of a closed loop parallel circuit traction system of the invention.

Microcontroller 42 is electronically connected (schematically shown as 48 in FIG. 1 and FIG. 4) to the speed sensing means of motors 32, 36 and is responsive to first and second electrical signals therefrom. Microcontroller 42 receives first and second electrical signals indicative of the speed of motors 32, 36 and compares the two. When both the tires and the drum are experiencing traction, the speed of motors 32, 36 is at the preselected ratio, and microcontroller does not cause any action to take place on motors 32, 36.

As is well known for a parallel, closed loop hydraulic circuit for compactors, when either the tires or the drum are slipping, the speed of the slipping member increases. The microcontroller 42 detects that the ratio is out of the preselected range, and immediately lowers the torque applied by the motor 32, 36 to the slipping member until the ratio comes back into range.

An alternate embodiment includes a ground slope sensing means 50 (FIG. 1), described hereinafter, to counteract a condition known as "tire hop". Tire hop occurs when compactor 1 is positioned on a slope wherein the tires 7 are elevated above drum 15, When compactor 1 moves up slope in this orientation, tires 7 experience bouncing and intermittent slippage, owing to the light weight on tires 7. Tire hop does not occur when compactor 1 is going down slope, or when drum 15 is elevated with respect to tires 7.

Slope sensing means 50 generates a third electrical signal to indicate when tires 7 are elevated above drum 15. Microcontroller 42,being electronically connected to slope sensing means 50, is responsive to the third electrical signal. Microcontroller 42 sends a signal to motor 32 to immediately lower the torque applied to tires 7 by motor 32, thereby lowering the speed of tires 7, which causes the preselected ratio of speeds between tires 7 and drum 15 to go out of range. Immediately, microcontroller 42 sends a signal to motor 36 to immediately lower the torque applied to drum 15 by motor 36, thereby lowering the speed of drum 15, which causes the preselected ratio of speeds between tires 7 and drum 15 to come back into range.

In operation, this invention uses a traction drive control system 40 that will maximize the traction capabilities of the machine regardless of ground conditions by monitoring and adjusting the tractive effort of each driving element to match ground conditions. This is done by monitoring the front and rear driving elements 7, 15, respectively, and when slipping is detected the control system 40 would reduce the torque being generated at that element while enabling the other element to continue driving with the first element driving at what ever tractive effort can be transmitted to the ground without spinout.

The speed sensing system 44, 46 would monitor the relative speed of the front and rear driving elements 7, and 15, respectively, and would sense when one of those elements first begins to slip. At this point the control system 40 would reduce the motor displacement or hydraulic pressure, thereby reducing the driving torque at that element to the point just prior to slipping, thus maximizing the tractive effort of this element. The reaction time that this occurs is important so the element doesn't spinout and dig a hole which would be more difficult to climb than the grade prior to spinning.

This invention will work if tires 7 are replaced by a second drum 15.

For a microcontroller 42, we prefer a microcontroller supplied by Sauer Sundstrand Company, under the designation "DC2 Microcontroller" described in booklet BLN 95-9041-3, March 1993.

For motors 32, 36 we prefer motors supplied by Sauer Sundstrand Company under the designation "Series 51 Motors With Electric Displacement Controls and a Hall Effect Speed Pick-Up" For motor 32 the Sauer Sundstrand further designation is: 51-V-060-A-Sl-N-EP-A5-J-Y-A6-NNS-015-AA-20-20-00. For motor 36 the Sauer Sundstrand further designation is: 51-V-060-R-D1-C-EP-A5-J-Y-A6-NNS-015-AA-20-20-00.

For slope sensing means 50, we prefer a device supplied by Sauer Sundstrand Company with the Model No. MCX106A.

Having described the invention, what is claimed is:

1. A soil compactor comprising:
   a. tractor means for supporting a rear portion of said compactor, said tractor means mounted on a pair of tires rotatably connected to a first transverse axle;
   b. drum means for compacting material having a rotatable drum mounted on a second transverse axle parallel to said first axle, said drum means connected to said tractor means;
   c. a closed loop, parallel hydraulic circuit means for propelling said compactor, said hydraulic circuit means comprising:
      (i) first hydraulic motor means for rotating said tires, said first motor means including an electronic torque control means for varying hydraulic displacement of said first motor means to vary the torque applied by said first motor means; and
      (ii) second hydraulic motor means for rotating said drum, said second motor means including an electronic torque control means for varying hydraulic displacement of said second motor means to vary the torque applied by said second hydraulic motor means;
   d. traction control means for controlling said hydraulic circuit means to selectively and independently vary the torque applied by the first and second hydraulic motors, whereby the tire rotation speed and the drum rotation speed are controlled to within a predetermined ratio of each other, said traction control means comprising:
      (i) a first speed sensing means for sensing the rotational speed of said first hydraulic motor and generating a first electrical signal proportional thereto;
      (ii) a second speed sensing means for sensing the rotational speed of said second hydraulic motor and generating a second electrical signal proportional thereto;

(iii) microcontroller means electrically connected to said first and second speed sensing means and to said electronic torque control means of each of said first and second motor means, said microcontroller means being responsive to said first and second electrical signals to drive said electronic torque control means of at least one of said first and second motor means so as to vary the torque applied by said one of said first and second motor means such that the tire rotation speed and the drum rotation speed are controlled to within said predetermined ratio;

e. slope sensing means for sensing when said compactor is positioned on a slope such that said tires are elevated above said drum, said slope sensing means being electrically connected to said microcontroller means; and f. means for generating a third electrical signal to indicate when said tires are elevated above said drum, said microcontroller means being responsive to said third electrical signal to reduce the torque applied by said first motor means by a predetermined amount to lower the tire rotation speed to permit said tires to maintain contact with a sloped surface, wherein said traction control means adjust the torque applied by said second motor means to maintain said drum speed and tire speed within said predetermined ratio.

2. The compactor of claim 1 wherein said predetermined ratio is fixed with a 5 percent slippage rate.

3. The compactor of claim 1 wherein said drum means is connected to said tractor means through an articulated joint.

4. A soil compactor comprising:

a. tractor means for supporting a rear portion of said compactor, said tractor means mounted on a pair of tires rotatably connected to a first transverse axle;

b. drum means for compacting material having a rotatable drum mounted on a second transverse axle parallel to said first axle, said drum means connected to said tractor means;

c. a closed loop, parallel hydraulic circuit means for propelling said vehicle, said hydraulic circuit comprising:
 (i) first hydraulic motor means for rotating said rear driving member;
 (ii) first means for varying the torque applied by said first hydraulic motor means;
 (iii) second hydraulic motor means for rotating said front driving member;
 (iv) second means for varying the torque applied by said second hydraulic motor means;

d. traction control means for controlling said hydraulic circuit means to selectively and independently vary the torque applied by said first and second hydraulic motors comprising:
 (i) a first speed sensing means for sensing the rotational speed of said first hydraulic motor and for generating a first electrical signal proportional thereto;
 (ii) a second speed sensing means for sensing the rotational speed of said second hydraulic motor and for generating a second electrical signal proportional thereto;
 (iii) micro controller means electronically responsive to said first electronic signal from said first hydraulic motor means and electronically responsive to said second electronic signal from said second hydraulic motor means;
 (iv) said micro controller means further calculating a motor speed ratio between said first and second hydraulic motor means;
 (v) said micro controller means further comparing said calculated motor speed ratio to a preselected motor speed ratio range; and
 (vi) said micro controller means further adjusting torque applied by said first and second hydraulic motor means to maintain said motor speed ratio within said preselected motor speed ratio range;

e. slope sensing means for sensing when said compactor is positioned on a slope wherein said tires are elevated above said drum; said slope sensing means including means for generating a third electrical signal to indicate when said tires are elevated above said drum; and f. said microcontroller means being electrically connected to said slope sensing means, responsive to said third electrical signal, for selectively varying the torque applied by said first and second hydraulic motor, whereby the torque applied by said first motor means is reduced to control tire rotational speed, to permit said tires to maintain contact with a sloped surface, and the torque applied by said second motor means is adjusted to maintain said drum speed and tire speed within said preselected motor speed ratio.

* * * * *

UNITED STATES PATENT AND TRADEMARK OFFICE
CERTIFICATE OF CORRECTION

PATENT NO. : 5,915,492
DATED : June 29, 1999
INVENTOR(S) : Yates et al.

It is certified that error appears in the above-identified patent and that said Letters Patent is hereby corrected as shown below:

On the title page:
In item [73], after "NJ" insert:

--; Sauer Inc., Ames, IA--

Signed and Sealed this

Fifth Day of September, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,917,492  
DATED : June 29, 1999  
INVENTOR(S) : Bereiter, et al.

It is certified that error appears in the above-identified patent and that said Letters Patent is hereby corrected as shown below:

<u>Column 14, claim 17,</u>
Line 2, please delete "for re-positioning at least some of the set of one or more subnodes in the first display region."

Signed and Sealed this

Twenty-eighth Day of August, 2001

*Attest:*

NICHOLAS P. GODICI  
*Attesting Officer*     *Acting Director of the United States Patent and Trademark Office*